United States Patent
Pereira et al.

(10) Patent No.: US 11,075,918 B2
(45) Date of Patent: Jul. 27, 2021

(54) COGNITIVE USER CREDENTIAL AUTHORIZATION ADVISOR

(71) Applicant: International Business Machines Corporation, Armonk, NY (US)

(72) Inventors: Edson Gomes Pereira, Sao Paulo (BR); Daniela Kern Mainieri Trevisan, Sao Paulo (BR); Thiago Rodrigues De Souza Costa, Belem (BR); Sergio Varga, Campinas (BR); Thiago Cesar Rotta, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 16/150,532

(22) Filed: Oct. 3, 2018

(65) Prior Publication Data
US 2020/0112568 A1 Apr. 9, 2020

(51) Int. Cl.
*H04L 29/06* (2006.01)
*G06N 20/00* (2019.01)

(52) U.S. Cl.
CPC ......... *H04L 63/105* (2013.01); *G06N 20/00* (2019.01); *H04L 63/0861* (2013.01); *H04L 63/102* (2013.01)

(58) Field of Classification Search
CPC . H04L 63/105; H04L 63/0861; H04L 63/102; G06F 15/18
USPC .......................................................... 726/4
See application file for complete search history.

(56) References Cited

U.S. PATENT DOCUMENTS

| | | | |
|---|---|---|---|
| 7,752,438 B2 | 7/2010 | Foster et al. | |
| 8,370,911 B1 | 2/2013 | Mallard | |
| 8,479,302 B1 | 7/2013 | Lin | |
| 9,419,799 B1* | 8/2016 | Chung | H04L 9/3247 |
| 2012/0137340 A1 | 5/2012 | Jakobsson et al. | |
| 2015/0013505 A1 | 1/2015 | Saito | |
| 2015/0019873 A1 | 1/2015 | Hagemann | |
| 2016/0188860 A1 | 6/2016 | Lee et al. | |
| 2017/0180388 A1* | 6/2017 | Belz | H04L 63/105 |
| 2019/0236249 A1* | 8/2019 | Pavlou | G06F 16/24578 |
| 2020/0004939 A1* | 1/2020 | Streit | H04L 63/102 |

FOREIGN PATENT DOCUMENTS

WO 2016039947 A1 3/2016

* cited by examiner

*Primary Examiner* — Evans Desrosiers
(74) *Attorney, Agent, or Firm* — Patterson + Sheridan, LLP (57) ABSTRACT

Techniques are provided for selectively granting access credentials through the use of a machine learning model. Embodiments include collecting data from one or more sources related to user access of an information technology (IT) infrastructure. Based on the collected data, a machine learning model is created for authenticating a request from a client device to access the computer system within the IT infrastructure based on the collected data, based on the machine learning model. An access credential is generated upon processing the user identifier as an input to the machine learning model, and the access credential is provided to the client device.

20 Claims, 9 Drawing Sheets

COGNITIVE USER CREDENTIAL AUTHORIZATION ADVISOR

BACKGROUND

The present application relates generally to computers and computer applications, and more particularly to computer security and generation of access credentials.

Existing information technology (IT) solutions require specialized users with in-depth technical knowledge. The existing complex and heterogeneous computing environments also call for an increase in support capabilities from different geographies, competencies, cultures and skills. In order to provide this type of support, the supporting users also need to be provided with credentials to access the computing environment. However, the size of the computing environment, the geographical dispersion of servers, networks, storage devices, and equipment, the security policies and guidelines and the security controls may drive organizations to spend a great deal of effort and time in these activities.

One conventional technique for managing security permissions within a computing environment is through the use of user authentication and authorization techniques. A lack of proper ID management and security policy can create security breaches and compromise an organization's computer environment. However, credentials are needed to provide computer environment support. In many situations only dedicated people are allowed to work in the servers, networks, storage devices, or other equipment due to a strict security policy. In other cases, the ID management is so controlled that enabling credential may require extensive controls and approvals, taking a long time until a support personnel can obtain a proper credential to begin working on computer environment.

SUMMARY

Various embodiments include systems and methods for automatically providing access credentials to users requesting access to an IT infrastructure or components of the IT infrastructure by utilizing machine learning models based on one or more sources, including human resource databases and asset or component management/registration databases.

According to one embodiment of the present disclosure, a method is provided. The method includes: collecting data from one or more sources related to user access of an information technology (IT) infrastructure, creating, based on the collected data, one or more machine learning models for authenticating one or more users requesting an access to the IT infrastructure based on the collected data, based on one or more machine learning models, generating one or more access credentials for the one or more users, and providing the one or more access credentials to the one or more users.

According to another embodiment of the present disclosure, a system is provided. The system includes: one or more computer processors; and a memory containing computer program code that, when executed by operation of the one or more computer processors, performs an operation comprising: collecting data from one or more sources related to user access of an information technology (IT) infrastructure, creating, based on the collected data, one or more machine learning models for authenticating one or more users requesting an access to the IT infrastructure based on the collected data, based on one or more machine learning models, generating one or more access credentials for the one or more users, and providing the one or more access credentials to the one or more users.

According to another embodiment of the present disclosure, a computer-program product is provided. The computer program product includes: a computer-readable storage medium containing computer program code that, when executed by operation of one or more computer processors, performs an operation including: receiving a request from one or more users to access one or more components in an IT infrastructure, identifying the one or more users requesting access to the IT infrastructure using biometric data associated each of the one or more users, collecting data from one or more sources related to user access of the IT infrastructure, based on the one or more machine learning models, generating one or more access credentials for the one or more users, and providing the one or more access credentials to the one or more users.

DETAILED DESCRIPTION

Conventional IT access systems lack an automated credential and accessing operation, which can dramatically impact technical operations, business targets, and/or financial constraints of organizations that have any number of IT needs. Automating the access granting operation can save time associated with human resources that have to approve IT requests, and can free-up computer resources that have categorical up-down access grant protocols from being placed in stand-by mode as an access request is pending. One or more embodiments of the present disclosure provide one or more operations for processing structured and unstructured data to create one or more machine models that determine policies and rules for accessing an IT infrastructure. The policies or rules can be processed by one or more computer components to automatically grant access to users seeking access to an IT infrastructure.

Figure 1:
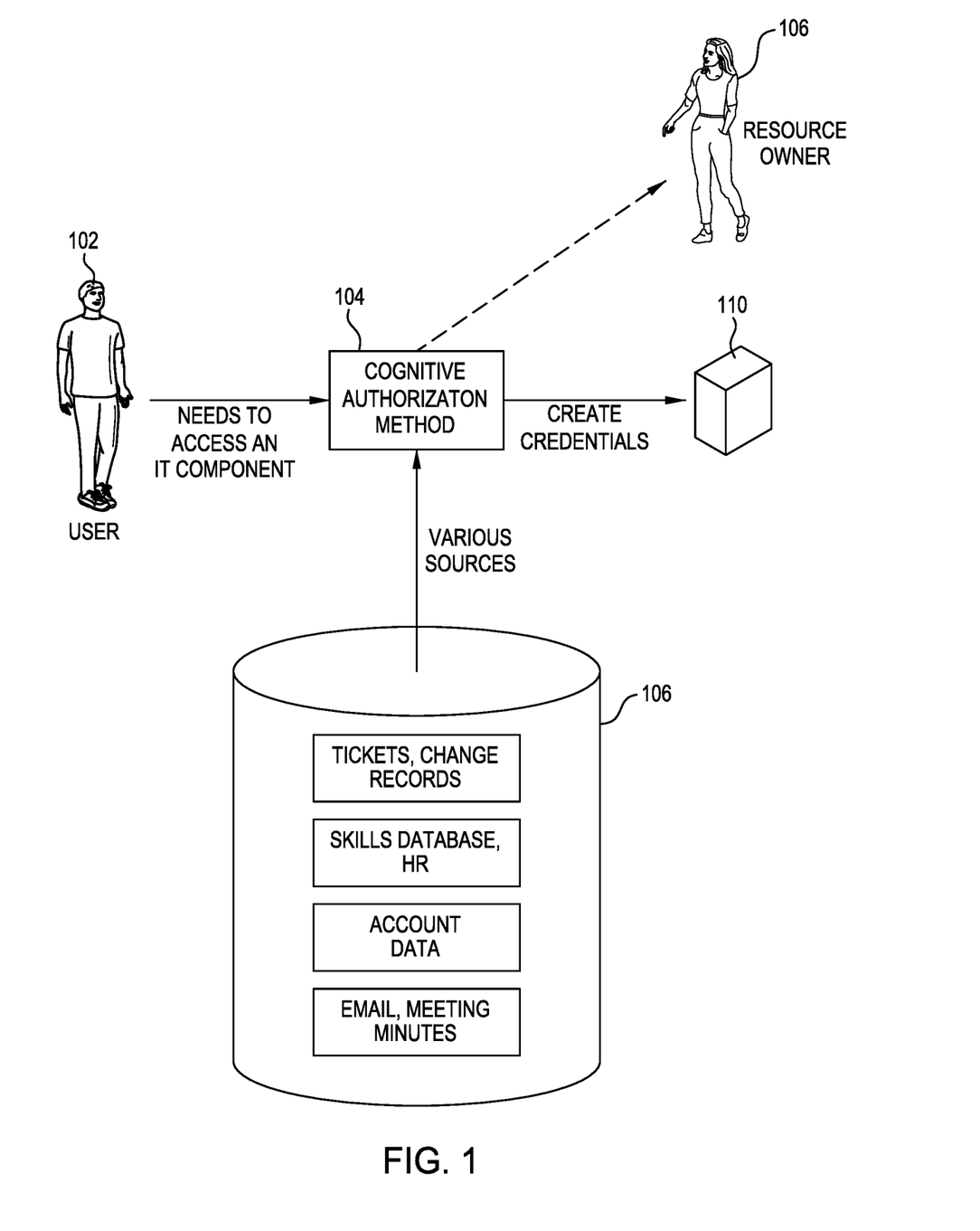
FIG. 1 illustrates a scheme for providing access credentials to one or more users requesting access to an IT infrastructure and according to an embodiment of the present disclosure.

FIG. 1 illustrates a scheme 100 for providing user credentials to one or more users 102 requesting access to an information technology (IT) infrastructure (or component therein) or system 110. One or more authorization methods and/or systems 104 will ingest information related to accessing the IT infrastructure, where the information stems from one or more databases 106 that contain the information relevant to accessing the infrastructure or system, and where the information can include servicing tickets associated with a job performed by the one or more users, human resources (FIR) records associated with the one or more users 102, a skill or job profile associated with the one or more users 102, an email address or history associated with the one or more users 102, data associated with work accounts associated with the one or more users 102, and/or meeting minutes associated with meetings attended by the one or more users 102. The one or more authorization methods and/or systems can communicate with resource owners 108 (or system owner 108 or component owner 108) to receive feedback that can be incorporated into the systems and/or methods 104 for a subsequent access request, or to override the system and/or methods 104 when appropriate.

Figure 2:
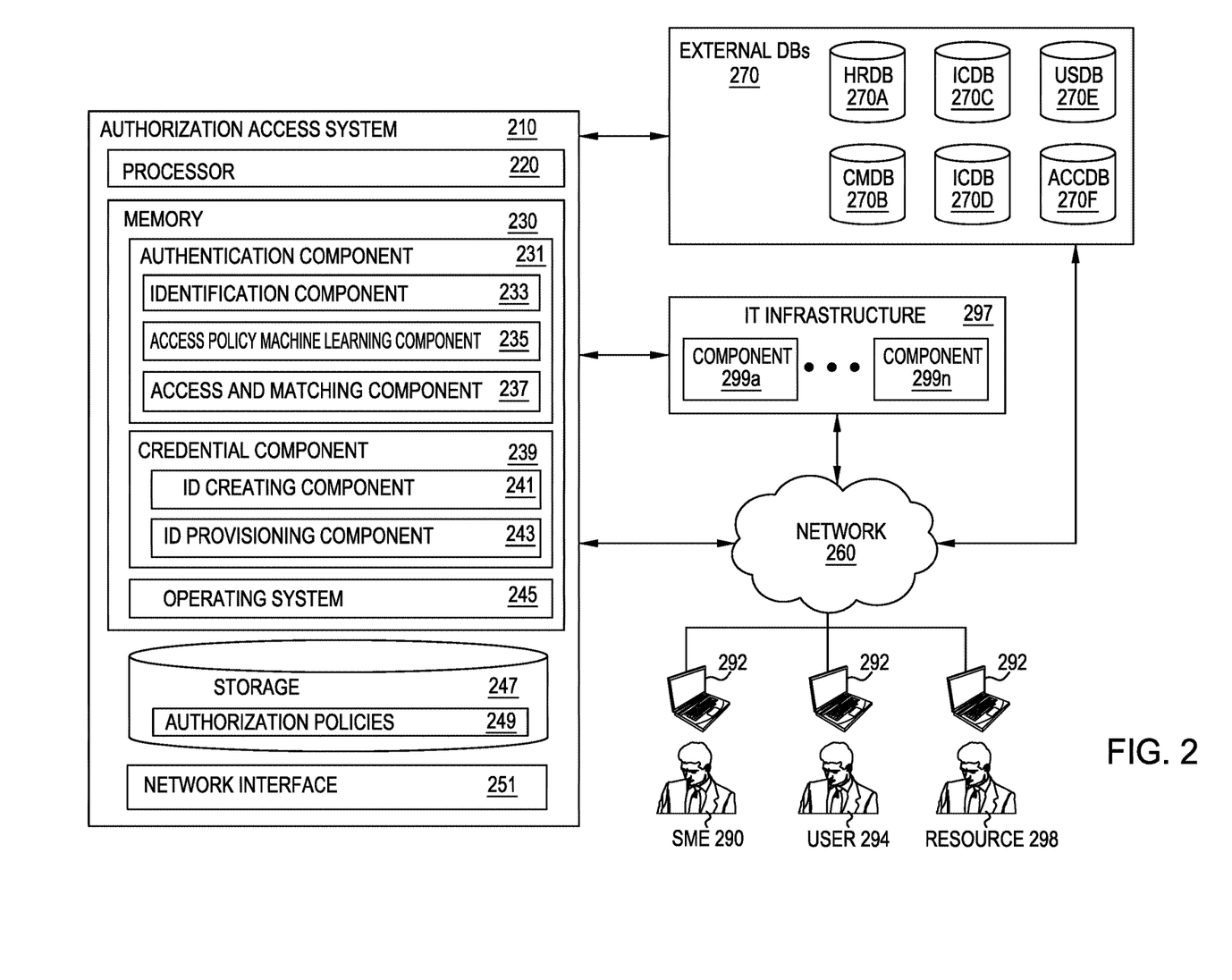
FIG. 2 illustrates a system for providing access credentials to one or more users requesting access to an IT infrastructure, according to an embodiment of the present disclosure.

FIG. 2 illustrates a credential generating and access granting system 200 according to at least one embodiment of the present disclosure. The system 200 includes an authorization access system 210, which in turn includes processor 220, memory 230, storage 246, and network interface 251 for interfacing and accessing network 260. The authorization access system 210 can communicate, via the network interface 251 or another suitable communication stream, with external databases 270 and one or more users 294 and/or subject matters experts ("SMEs") 290, and/or resource owners 298 (or system owner 298 or component owner 298), where the users 294, SMEs 290, and resource owners 298 can interface with the network 260 via one or more computer devices with suitable components for accessing a network 260. The network 260 can be any suitable network as described herein, including an Internet or Intranet network connection.

Memory 230 includes several components and sub-components that can be executed by the processor to carry out one or more aspects of the present disclosure. Memory components include authentication component 231, credential component 239, and operating system 245, where operating system 245 can be any suitable operating system. The authentication component 231 performs one or more tasks, directly or via one or more sub-components, related to creating the rules and processing parameters for granting one or more users 294 access to an IT system or infrastructure 297 or one or more infrastructure devices, components or assets 299. The authentication component 231 includes an identification component 233, an access policy machine learning component 235, and an access and matching component 237. The identification component 233 can receive a request from the one or more users 294 or a structured request through a formal tool providing for identification of the one or more users (not shown). The identification component 233 can be, for example, a biometric identification that can capture biometric image from the one or more users and authenticate the one or more users through predefined biometric database or any other organization database, such as one or more of the external databases 270.

The access policy machine learning component 235 can search or query multiple sources of information, including the one or more databases 270, for user information associated with the one or more users 294. The one or more external databases can include human resources databases (HRDB) 270A, configuration management database (CMDB) 270B, an incident and change systems database (ICDB) 270C, a skills and responsibilities database (SRDB) 270D, a biometric database (BDB) 270E, and an accounts database (ACCDB) 270F.

In one embodiment, the HRDB 270A contains information about employees and contractors associated with an entity that owns, controls, or exercises over the infrastructure 297, including whether those employees or contractors are active, and their hierarchy in the organization or entity. In one embodiment, the CMDB 270B includes information about the individual components or assets 299 of the IT infrastructure 297, including access history associated with the assets 299, whether the assets 299 are registered as active assets, and ticket history associated with users or owners, e.g., SME 290 or resource owner 298, that have accessed particular assets 299 and conducted work (including the type of work) on the assets 299. In one embodiment, the ICDB 270C can contain information as to the specific asset classes or assets that the one or more users 294 support, the support group or team that forms the basis for the one or more user's technical support role with respect to the IT infrastructure 297.

In one embodiment, the SRDB 270D includes information related to the one or more users 294 with respect to their specific role in the organization, general skills they possess, and technical skills and other skills they possess in relation to use and servicing of components 299 in the infrastructure. In one embodiment, the biometric database 270E includes biometric data or other information that can be used by the authentication component 231 and one or more of its sub-components (e.g., identification component 233) to identify one of the one or more users 294, for example, facial recognition data, fingerprint data, DNA data, or any other relevant information that can identify the user. The accounts database 270F includes information on the individuals, including the one or more users 294, who are authorized to support technical applications, customer accounts, or technical support accounts associated with the organization that owns the IT infrastructure. The accounts database 270F also includes information on assets, e.g., components 299(a)-(n), that are associated with technical applications, customer accounts, or technical support accounts associated with the organization that owns the IT infrastructure 297.

In one embodiment, the access policy machine learning component 235 of the authentication component 231 can query the one or more databases 270 to create one or more machine learning modules for producing access credentials for the one or more users 294. The machine learning models can be based, in whole or in part, on the information contained in the external databases, including based on human resources systems and records, user skill and responsibilities entries, incident and change systems, access history for the user requesting access, and/or access history for similar users and devices database.

In one embodiment, the access policy machine learning component 235 can query the relevant databases 270 for previous matches between user identifiers corresponding to the one or more users 294 requesting access and the specific device 299, and user identifiers for similar users (based on experience, skills, responsibilities, etc.) accessing the device 299 device or similar devices part of the IT infrastructure 297. In one embodiment, the access policy machine learning component 235 can examine the policies, as indicated in the HRDB 270A or the CMDB database 270B, that are in effect for authorizing access requests to a component 299 of the IT infrastructure 297.

In one embodiment, in addition to accessing and processing unstructured and structured data in one or more of the external databases 270, the access policy machine learning component 235 can receive unstructured information from the client devices 292 used by the users 294 or the SMEs 290 otherwise associated with the IT infrastructure 297. The SMEs 290, using the corresponding client devices 292, can annotate unstructured domain literature, and use those annotations can create a custom machine learning model that understands the requirements and technical nature of the IT infrastructure 297.

In one or more embodiments the access policy machine learning component 235 can populate a relational database identified as authorization policies 249 (located in any suitable storage device 247 of system 210) with one or more set of policies or rules determined by the one or more machine learning models.

In one embodiment, the access and matching component 237 can use one of the machine learning models generated by the access policy machine learning component 235. When a request is received from a client 292 for a user credential for at least one IT component 299 of the IT infrastructure 297, the access and matching component 237 can examine the rules recorded in the authorization policies database 249 and will evaluate the request. Utilizing the information in the authorization policies database 249 and other additional information (which can be from external systems and actors, e.g., input from SMEs 290), the access and matching component 237 can determine whether access is proper.

In one embodiment, the access and matching component 237 is configured to employ a threshold and index scheme, e.g., as it verifies that the one or more users 294 fit the criteria of one or more policies, the access and matching component 237 increases the authorization level index. If the authorization index exceeds a threshold, then the access and matching component 237 will issue a request to the credential component 239 to create and provide an access credentials, e.g., an access ID, to the one or more users 294. If the authorization threshold falls below a suitable positive threshold for granting access, but above a threshold that denies access, the access and managing component 237 can inform the IT component resource owner 298 that a failed request was raised by one or more users 294, and then the resource owner 298 can take appropriate action. In one embodiment, the access and matching component 237 can provide feedback to the one or more machine learning models with respect to the result of a particular request, which by extension can result in an updating of the rules and policies in the authorization policies database 249.

In one embodiment, the access and matching component 237 can also review emails (which are accessible by direct input by the one or more users 294 or located in one or more of the external databases 270) exchanged between one or more users 294 and the IT component 297 owner 298 to ensure there was some pre-approval, which results in an increase in the authorization level.

As stated above, if a sufficient authorization threshold is reached, one or more components of the credentials component 239 will generate and provide access credentials to the one or more users 294. In one embodiment, the ID creating component 241 will generate the relevant access credentials for the one or more users 294, and the ID provisioning component 243 will interface with the ID creating component 241 and the network 260 to provide the access credentials to the one or more users 294.

Figure 3A:
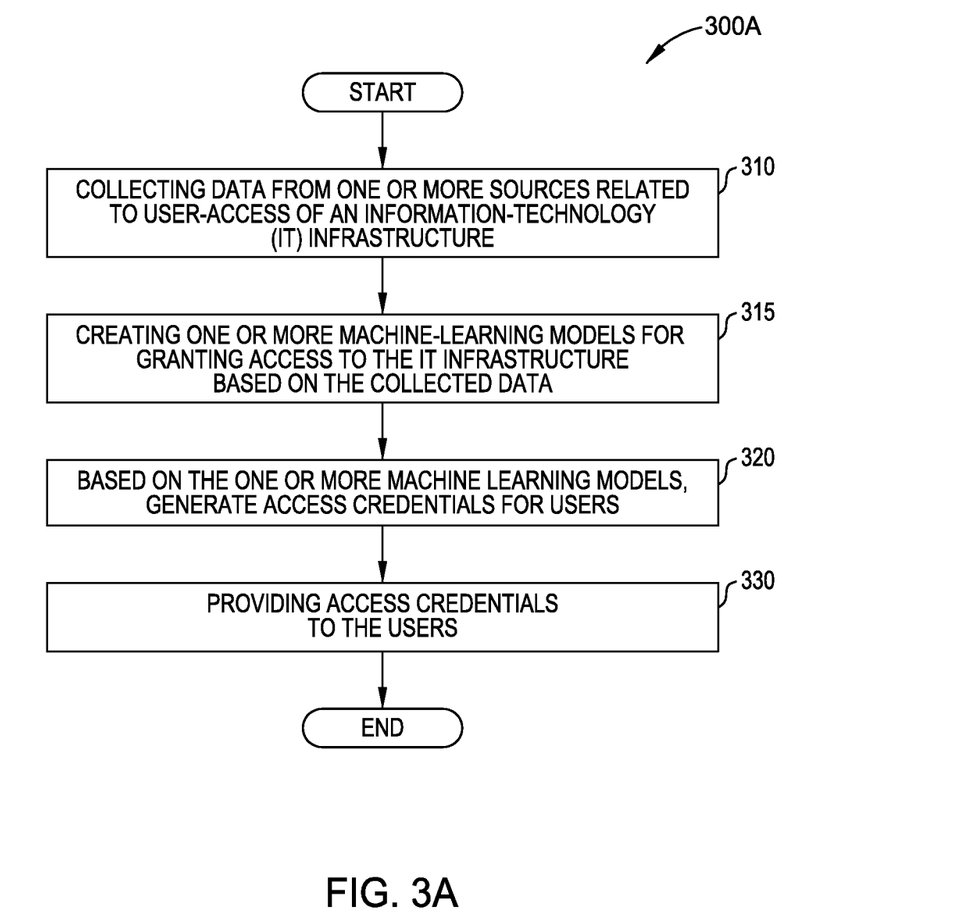
FIG. 3A illustrates a flow for providing access credentials to one or more users requesting access to an IT infrastructure, according to an embodiment of the present disclosure.

FIG. 3A illustrates a flow 300A for providing access to credentials to one or more users 294 according to an embodiment of the present disclosure. In one embodiment, per block 310, the access policy machine learning component 235 collects data from one or more sources related to user access of an information technology (IT) infrastructure 297, including the external database 270 and/or one or more SMEs 290. The access policy machine learning component 235 can initiate the collecting based on a request from a client device 292 to access a component 299($a$)-($n$) (e.g., a computer system) within the IT infrastructure 297, as part of an automatic protocol to establish rules for accessing the infrastructure 297, or at the request of another entity, including the resource owner 298 of the IT infrastructure 297. In one embodiment, per block 315, based on the collected data, the access policy machine learning component 235 creates one or more machine learning models for authenticating the request from the client device 292 requesting to access the component within the IT infrastructure 297 and specifying a user identifier. In one embodiment, per block 320, the user identifier is processed as an input to the machine learning model to authenticate the request from the client device, and upon determining to grant the request, an access credential is generated. For example, in one embodiment, per block 330, one or more components of the credential component 239 provide the access credential to the client device 292.

Figure 3B:
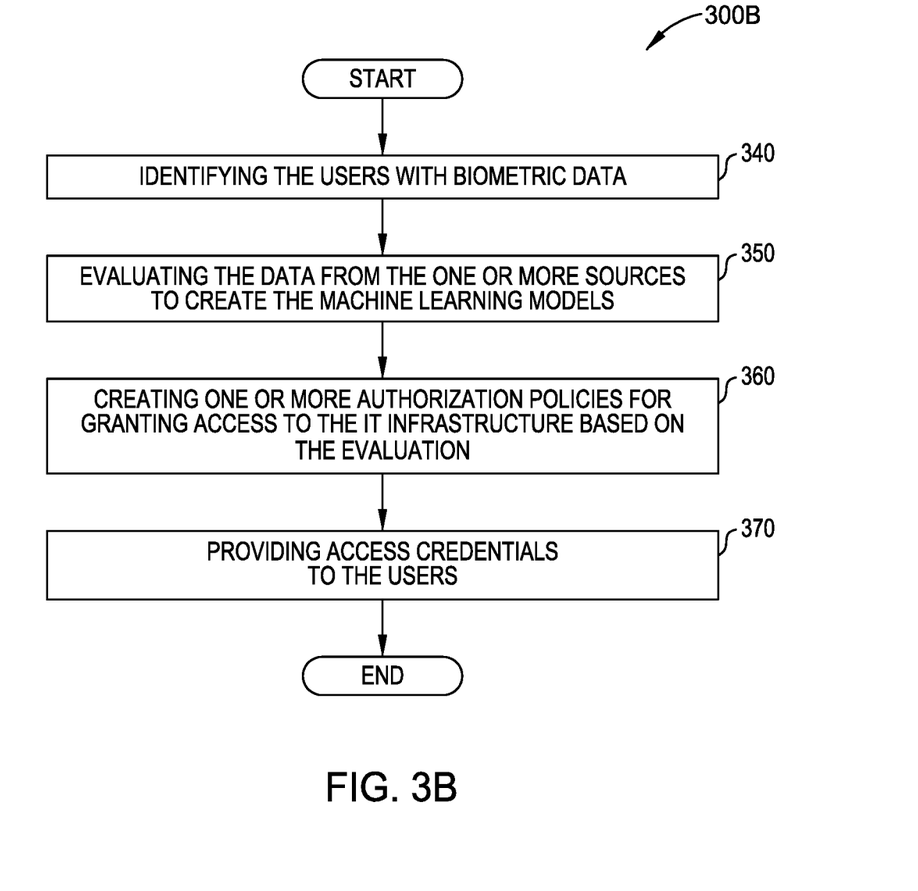
FIG. 3B illustrates a flow for providing access credentials to one or more users requesting access to an IT infrastructure, according to an embodiment of the present disclosure.

FIG. 3B illustrates a flow 300B for providing access to credentials to one or more users 294 according to an embodiment of the present disclosure. The flow beings at block 320 of FIG. 3A. In one embodiment, as shown in block 340, the identification component 233 accesses biometric data associated with the one or more users 294 contained in one or more external databases 270, and verifies the identity of the one or more users 294 based on biometric data. In one embodiment, the identification component 233 performs the identification as a pre-requisite for executing any of the operations associated with the blocks of FIG. 3A.

In one embodiment, as show in block 350, the access policy machine learning component 235 will evaluate the collected data to create one or more machine learning models associated with the granting access to the one or more users 294. The evaluated sources can include one or more human resource policies in HRDB 270A, an access history contained in the CMDB 270B for the one or more users 294 requesting access to the one or more components 299 of the IT infrastructure 297, an urgency level associated with the access request as indicated by the one or more users 294 making the request, and/or an access history of another one or more users 294 requesting access to the one or more components of the IT infrastructure as indicated in database 370C, where the another one or more users 294 have one or more common credentials with the one or more users 294 requesting access as contained in the SRDB 270D. The access policy machine learning component can evaluate data from any other suitable source as described herein. In block 360, based on the evaluation, the access machine policy learning component 235 can create one machine learning models that determine one or more authorization policies for granting access to the IT infrastructure 297 (or a component 299 therein), and store the policies in an authorization policies database 249. In block 370, the credentialing component 239, based on the machine learning models and in coordination with the authentication component 241, can generate and provide the one or more users 294 with access credentials.

Figure 4:
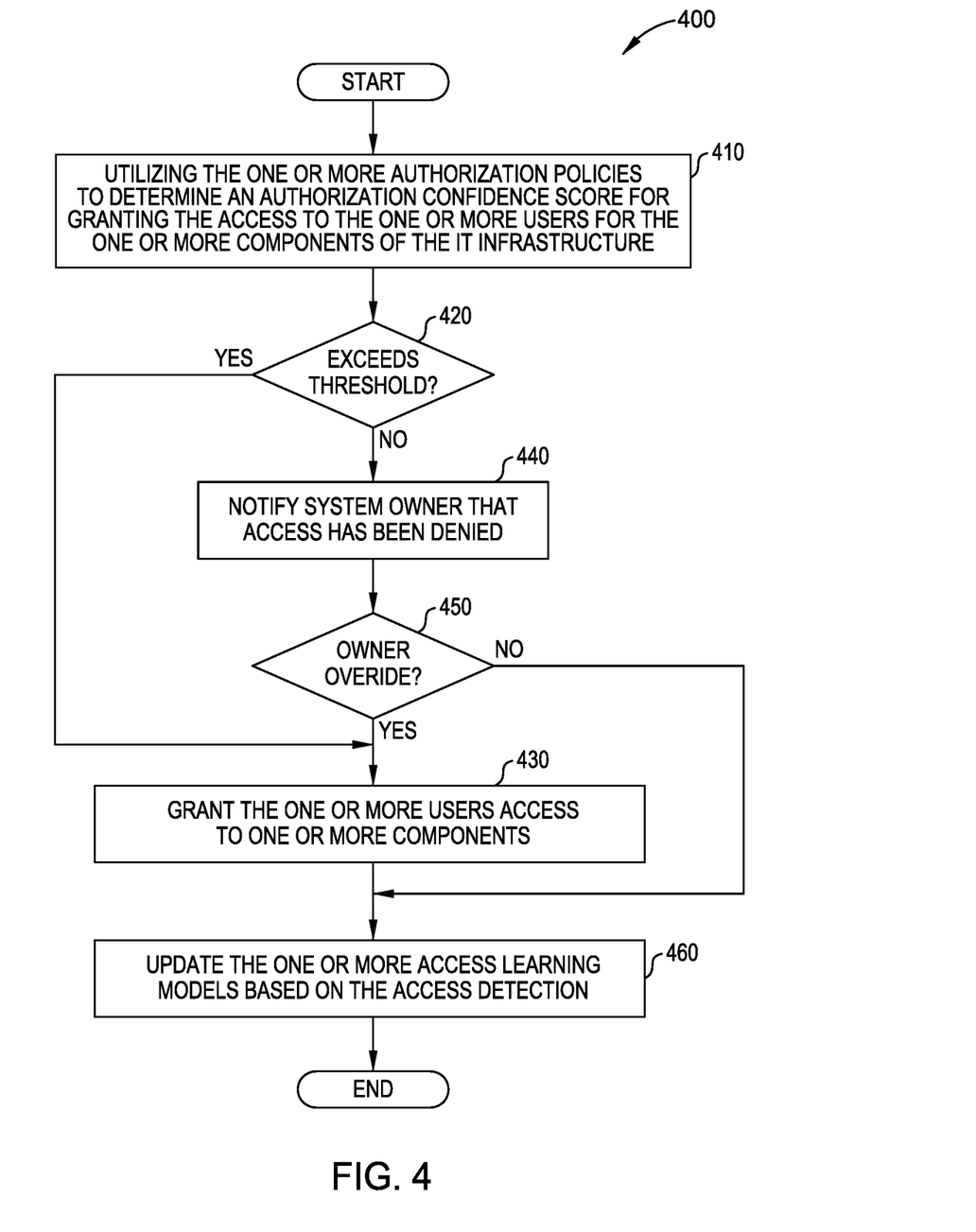
FIG. 4 illustrates a flow for providing access credentials to one or more users requesting access to an IT infrastructure, according to an embodiment of the present disclosure.

FIG. 4 illustrates a flow 400 for granting access to an IT infrastructure 297 (or components therein 299) for one or more users 294. The flow begins at block 360. In one embodiment, per block 410, the access matching component 237 utilizes the one or more authorization policies to determine an authorization confidence score (or "authorization score") for granting access to one or more users 294 requesting access to the IT infrastructure 297 (or components 299 therein). In block 420, the access matching component 237 determines if the authorization confidence score exceeds a threshold. If the authorization confidence score exceeds a threshold, per block 430, then the access matching component 237 coordinates with one or more components of the credentials component 239, resulting in granting access credentials to the one or more users 294. If the authorization confidence score is below a certain threshold, per block 440, then the access matching component 237 can notify a resource owner 298 (or system owner 298 or component owner 298) of the IT infrastructure 297 or a component 299 therein, and the resource owner 298, per block 450, can indicate that the access credentials should be granted, reverting to block 430, or denied, resulting in the flow proceeding to block 440. In one embodiment, per block 460, whether the access credentials are granted or denied, the access matching component 237 will coordinate with the access policy machine learning component 235 to update the one or more machine learning models based on the result, which in turn results in an update of the access policy and rules stored in authorization policies database 249.

Figure 5:
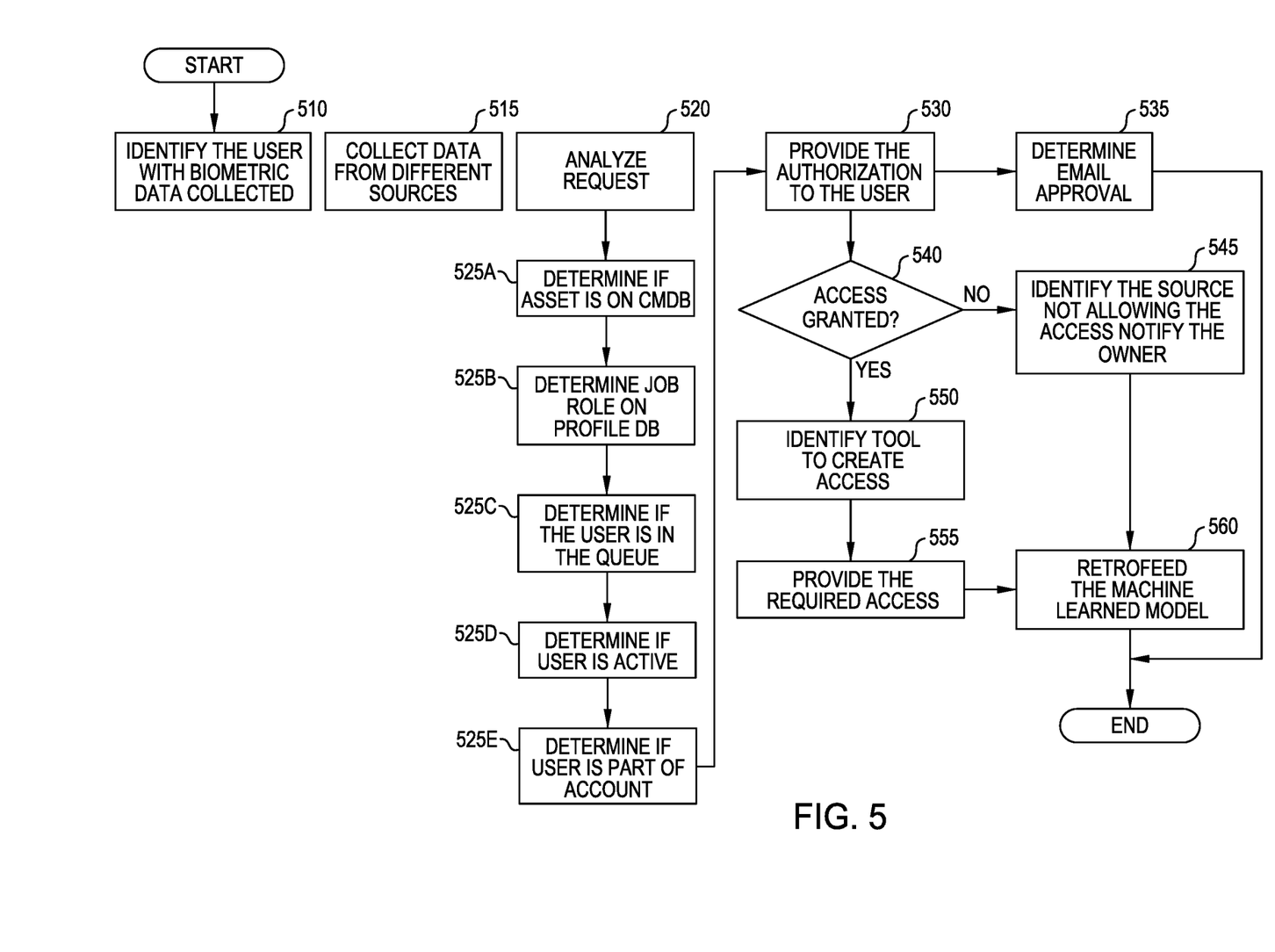
FIG. 5 illustrates a flow for providing access credentials to one or more users requesting access to an IT infrastructure, according to an embodiment of the present disclosure.

FIG. 5 illustrates a flow 500 for granting access credentials to an IT infrastructure 297 (or components 299 therein) according to an embodiment of the present disclosure. In one embodiment, per block 510, the identification component 233 identifies one or more users 294 attempting to access the IT infrastructure 297 using biometric information via a biometric reader, (where the biometric information can be located in one or more external databases 270). In one embodiment, per block 515, the access policy machine learning component 235 collects information from one or more external databases 270, to generate one or more machine learning models that determine a set of rules or policies for granting access to the IT infrastructure 297 to one or more users 294, where the rules and/or policies can be stored in authorization policies database 249. In block 520, the access and matching component can analyze the policies and rules in relation to a request from one or more users 294 to access the IT infrastructure, where the analysis is pursuant to an authorization threshold scheme. In block 525A, the access and matching component 237 increases the authorization threshold by determining that the component 299 sought for access by the one or more users 294 is part of the CMDB 290B. In block 525B, the access and matching component 237 increases the authorization threshold by determining that the one or more users 294 have a job role or position that is relevant to the asset or component 299 sought for access, where the determination is made by querying one or more external databases 270, including HRDB 270A and ICDB 270C. In one embodiment, per block 525C, the access and matching component 237 increases the authorization level by examining one or more external databases 270 to determine that the one or more users 294 are part of a support queue associated with the asset. In one embodiment, per block 525d, the access and matching component 237 increases the authorization level index by determining that the one or more users 294 are active members of the organization that owns the asset by examining one or more databases 270, including HRDB 270A. In one embodiment, per block 525E, the access and matching component 237 increases the authorization level by determining that the one or more users 294 are part of the account owning the component 299 sought for access, including examining the ACCDB 270F. In any of steps 525A-525F, if the access and matching component 237 makes a negative determination, e.g. that the one or more users 294 are not part of the organization or the queue, that the asset 298 is not part of the CMDB, etc., then the authorization index decreases.

In one embodiment, per block 535, in the instance when the authorization index did not meet or exceed the threshold necessary to grant the one or more users 294 access credentials, the access and matching component 237 can determine, by accessing emails from the one or more users 294 (where the emails can be located in one or more external databases 270 or any other suitable source), if there was any email approval from an IT component/resource owner 298 to allow access to the IT infrastructure 297 or component 299 therein. If access and matching component 237 determines that the authorization from the resource owner 298 exists, then authorization index increases, where in one embodiment the authorization is a definitive indicator that access credentials should be provided.

In one embodiment, per block 540, if the authorization index exceeds the required threshold for access, then, per block 550 the access and matching component 237 will coordinate with the credential component 239 to create access credentials for the one or more users 294, and per block 555, the credential component 239 will provide the one or more users 294 with the access credentials for the IT infrastructure 297 or an asset 299 therein.

In one embodiment, per block 545, if the threshold for the authorization index was below the threshold for access, then the access and matching component 237 can notify the resource owner 298, who can override the denial, and/or notify the one or more users 294 so that they are aware of the denial.

In one embodiment, per block 560, whether the one or more users 294 were granted access credentials or not, the access and matching component 237 can coordinate with the access policy machine learning component 235 to update the machine learning models that determine the authorization policies and rules, where in one embodiment the update is reflected in authorization policies database 249.

Figure 6:
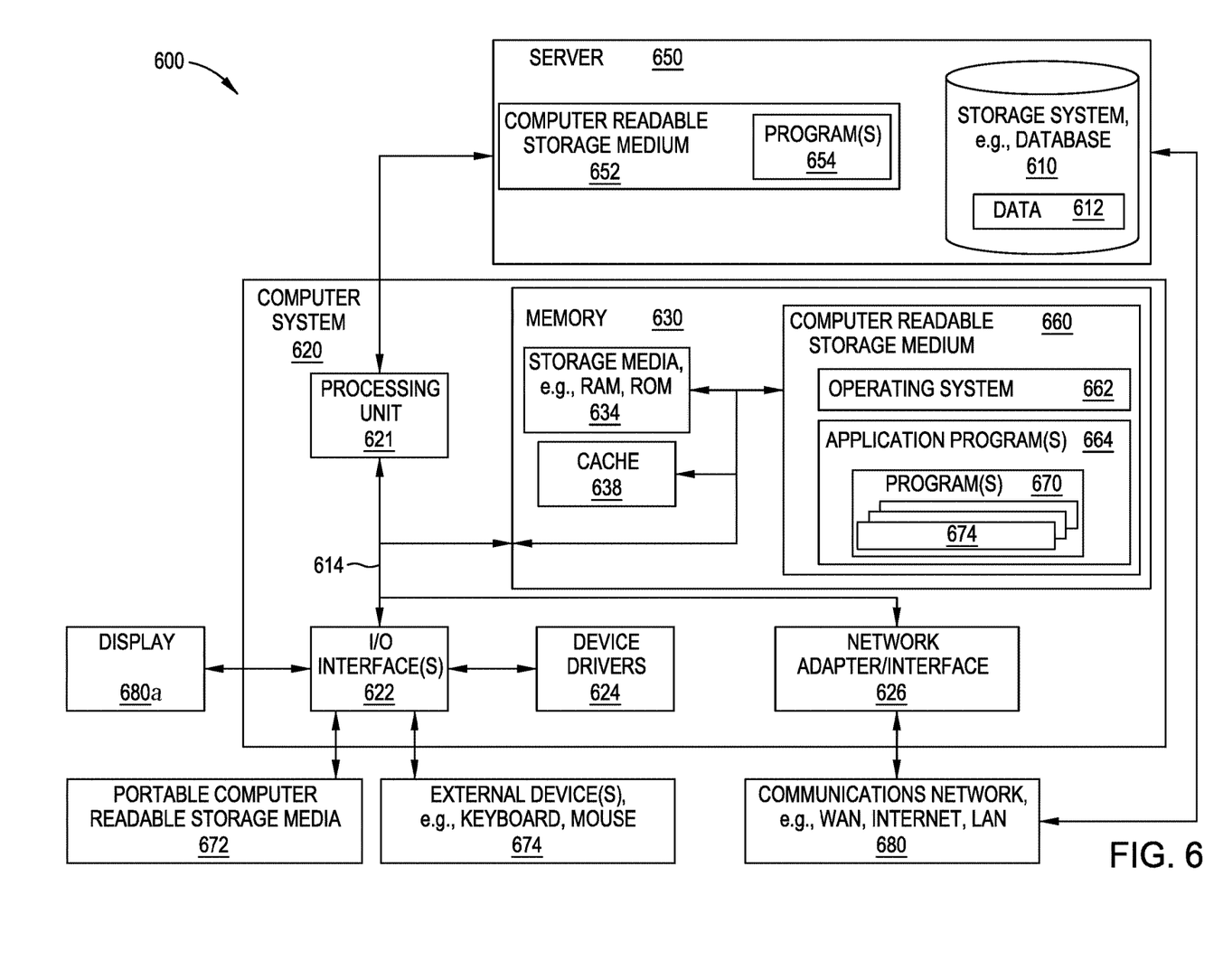
FIG. 6 illustrates an exemplary computer device in accordance and useful with at least one embodiment of the present disclosure.

FIG. 6 illustrates a computer system 600 that can execute one or more flows of the present disclosure, including the flows of FIGS. 3A, 3B, 4 and 5. The components of the computer 620 may include, but are not limited to, one or more processors or processing units 621, a system memory 630, and a bus 614 that couples various system components including system memory 630 to processor 621.

The bus 614 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 620 typically includes a variety of computer readable media. Such media may be any available media that is accessible by the computer 620 (e.g., computer system, or server), and can include both volatile and non-volatile media, as well as, removable and non-removable media.

Computer memory 630 can include additional computer readable storage media 634 in the form of volatile memory, such as random access memory (RAM) and/or cache memory 638. The computer 620 may further include other removable/non-removable, volatile/non-volatile computer storage media, in one example, portable computer readable storage media 672. In one embodiment, a computer readable storage medium 652 can be provided for reading from and writing to a non-removable, non-volatile magnetic media. The computer readable storage medium 652 can be embodied, for example, as a hard drive. Additional memory and data storage can be provided, for example, as a storage system 610 (e.g., a database) for storing data 612 and communicating with the processing unit 621. The database can be stored on or part of a server 650. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 614 by one or more data media interfaces. As will be further depicted and described below, memory 630 may include at least one program product which can include one or more program modules that are configured to carry out the functions of embodiments of the present disclosure.

One or more computer programs can generically be referred to as a program 660. The program 660 can include program modules 654, and may be stored in memory 1030. By way of example, the memory 630 may store an operating system 652, an application program 654, other program modules, and program data. The program modules 654 can generally carry out functions and/or methodologies of embodiments of the present disclosure as described herein, including flows 300A, 300B, 400 and 500. The one or more programs 670 are stored in memory 630 and are executable by the processing unit 621. It is understood that the operating system 662 and application program 664 stored on the computer readable storage medium 660 are similarly executable by the processing unit 621.

The computer 620 may also communicate with one or more external devices 1074 such as a keyboard, a pointing device, a display 680a, etc.; one or more devices that enable a user to interact with the computer 620; and/or any devices (e.g., network card, modem, etc.) that enables the computer 620 to communicate with one or more other computing devices. Such communication can occur via Input/Output (I/O) interfaces 622. Still yet, the computer 620 can communicate with one or more networks 680 such as a local area network (LAN), a general wide area network (WAN), and/or a public network (e.g., the Internet) via network adapter/interface 626. As depicted, network adapter 626 communicates with the other components of the computer 620 via bus 614. It should be understood that although not shown, other hardware and/or software components could be used in conjunction with the computer 1010. Examples, include, but are not limited to: microcode, device drivers 1024, redundant processing units, and external disk drive arrays, RAID systems, tape drives, and data archival storage systems, etc.

The flows of the present disclosure, e.g. 300A (FIG. 3A) may be embodied in a program 670 (FIG. 6) embodied on a computer readable storage device, for example, generally referred to as memory 630, and can more specifically refer to computer readable storage medium 660, as shown in FIG. 6. The program 670 is executable by the processor 621 of the computer system 620 (to execute program steps, code, or program code). Additional data storage may also be embodied as the database 610 which includes data 612. The program or executable instructions may be offered as a service by a provider. The computer 620 and program 670 shown in FIG. 6 are generic representations of a computer and program that may be local to a user, or provided as a remote service (for example a cloud based service), and may be provided in further examples, using a website accessible using a network 680 (e.g., interacting with a network, the Internet, or cloud services). It is understood that the computer 620 and computer system 600 also generically represents herein a computer device or a computer included in a device, such as a laptop or desktop computer, etc., or one or more servers, alone or as part of a datacenter. The computer and computer system can include the network adapter/interface 626, and the input/output (I/O) interface(s) 622. The I/O interface 622 allows for input and output of data with an external device 674 that may be connected to the computer system. The network adapter/interface 626 may provide communications between the computer system and a computer network generically shown as the network 680. The method steps and system components and techniques may be embodied in modules of the program 670 for performing the tasks of each of the steps of the method and system, which are generically represented in FIG. 3A, FIG. 3B, FIG. 4, and FIG. 5 as program modules 674. The program 670 and program modules 674 can execute specific steps, routines, sub-routines, instructions or code, of the program. The method of the present disclosure can be run locally on a device such as a mobile device, or can be run a service, for instance, on the server 650 which may be remote and can be accessed using the communications network 680.

It is understood that a computer or a program running on the computer 620 may communicate with a server, herein embodied as the server 650, via one or more communications networks, herein embodied as the network 680. The communications network 680 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer, including a mobile device, can use a communications system or network 680 which can include the Internet, or a public switched telephone network (PSTN), for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It should be understood that the words "alert," "status" and "progress" are used loosely and are not intended to suggest any limitation as to the scope of use or functionality of embodiments of the present principles described herein. For example, "alert," "status" and/or "progress" may refer to, but are not limited to, a level of task completion of one or more deliveries, an amount of time associated with a delivery, a level of turbulence experienced during a delivery, an indication of temperatures traversed during delivery, a level of gravitational force and/or tilt experienced during delivery, a value associated with the items for delivery, etc. It should also be understood that the word "flight" is used loosely and is not intended to suggest any limitation. For example, "flight" may refer to, but is not limited to, any stage during the delivery of an item, such as when the drone has landed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software service, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
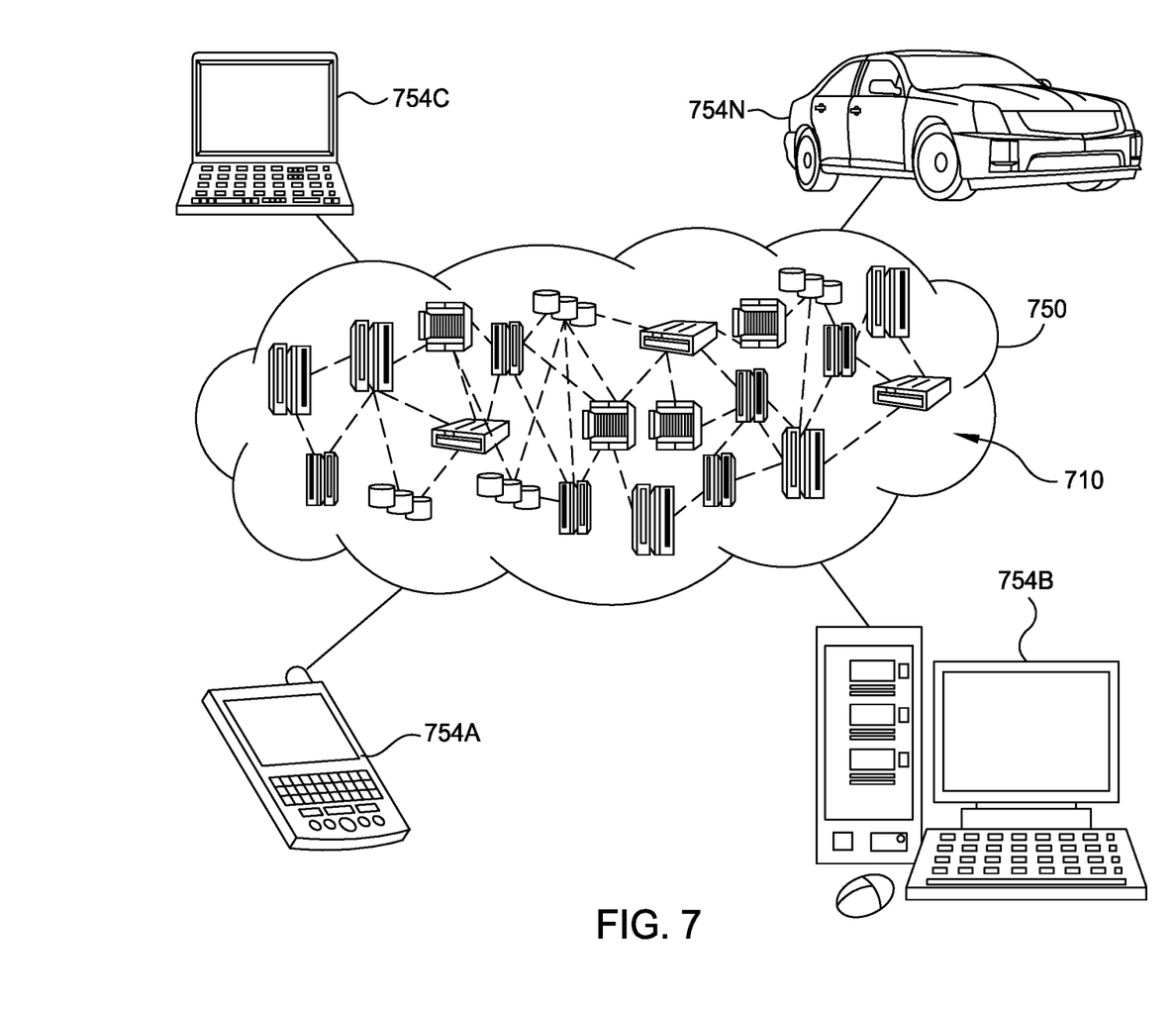
FIG. 7 illustrates an exemplary cloud computing environment in accordance with at least one embodiment of the present disclosure.

Referring now to FIG. 7, illustrative cloud computing environment 750 is depicted. As shown, cloud computing environment 750 includes one or more cloud computing nodes 10 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices It is understood that the types of computing devices 754A-N shown in FIG. 7 are intended to be illustrative only and that computing nodes 710 and cloud computing environment 850 can communicate with any type of computerized device over any type of network and/or network addressable connection (e.g., using a web browser).

Figure 8:
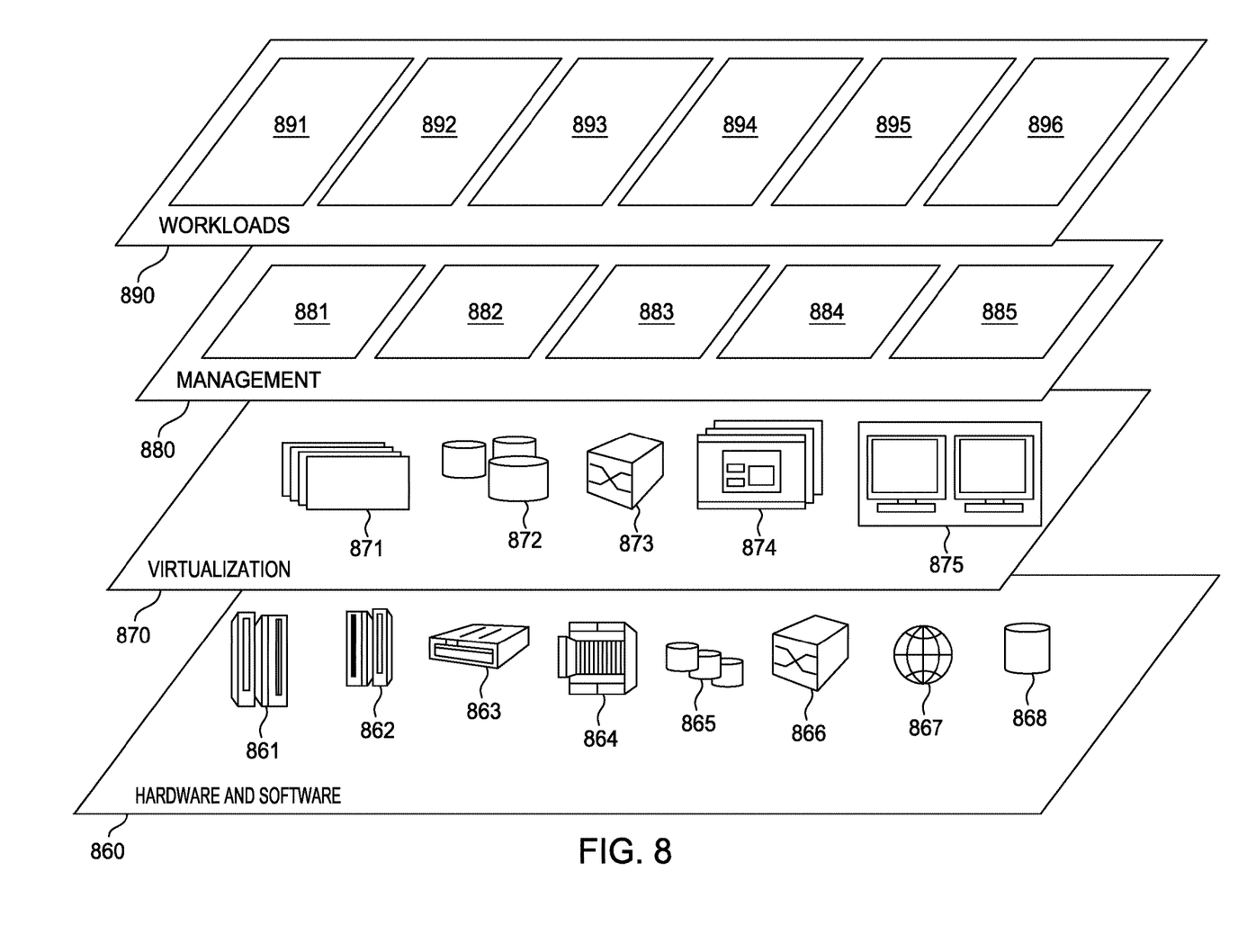
FIG. 8 illustrates exemplary abstraction model layers in accordance with at least one embodiment of the present disclosure.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided: Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866.

In some embodiments, software components include network application server software 867 and database software 868. Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met.

Service Level Agreement (SLA) planning and fulfillment 885 provide pre-arrangement for, and procurement of, cloud computing resources for which a future requirement is anticipated in accordance with an SLA. Workloads layer 990 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and provision of user access credentials for one or more IT infrastructures and components of the same, access to IT infrastructures and components of the same, and interfacing for IT infrastructures 896.

While the foregoing is directed to embodiments of the present invention, other and further embodiments of the invention may be devised without departing from the basic scope thereof, and the scope thereof is determined by the claims that follow.

What is claimed is:

1. A method for generating access credentials for a computer system within an information technology (IT) infrastructure, comprising:
   collecting data on a computer from one or more computerized sources communicating with the computer via a communications network, the collected data related to user access of the IT infrastructure;
   creating, based on the collected data, a machine learning model for authenticating a request from a client device to access the computer system within the IT infrastructure, wherein the request specifies a user identifier, and wherein creating the machine learning model comprises:
      evaluating the collected data related to user access, wherein collected data includes: i) one or more policies for granting access to the IT infrastructure, and ii) an urgency level associated with the request; and
      creating an authorization policy for granting access to the computer system based on the evaluation;
   upon processing at least the user identifier as an input to the machine learning model and determining to grant the request based on an output of the machine learning model, generating an access credential corresponding to the user identifier; and
   providing the access credential to the client device.

2. The method of claim 1, further comprising:
   identifying the one or more users requesting access to the IT infrastructure using biometric data associated with the user identifier.

3. The method of claim 1, wherein creating the machine learning model further comprises:
   evaluating ii) an access history corresponding to the user identifier, and ii) an access history corresponding to another user identifier specified in other requests to access the computer system, wherein the another user identifier has one or more common credentials with the user identifier specified in the request.

4. The method of claim 3, wherein generating the access credential comprises:
utilizing the authorization policy to determine an authorization confidence score for granting the request to access the computer system within the IT infrastructure; and
upon determining that the authorization confidence score exceeds a predefined threshold level of confidence, granting the request.

5. The method of claim 4, wherein utilizing the authorization policy to determine an authorization confidence score further comprises:
increasing the authorization score if at least one of:
the user identifier is registered in a configuration management database associated with the computer system to be accessed,
the user identifier is registered in a human resources database as having a role compatible with the computer system to be accessed,
the user identifier is registered in the human resources database as being part of a group associated with the computer system to be accessed,
the user identifier is registered as an active asset in the human resources database, and
the user identifier is registered in the human resources database as associated with an account that owns the computer system to be accessed.

6. The method of claim 4, further comprising:
determining a second authorization confidence score for granting a second request to access the computer system;
upon determining that the second authorization confidence score is less than the predefined threshold level of confidence, denying the second request to access the computer system;
generating a notification that indicates the second request was denied.

7. The method of claim 4, further comprising:
updating the machine learning model and the authorization policy, based on whether the request was granted.

8. A system, comprising:
one or more computer processors; and
a memory containing computer program code that, when executed by operation of the one or more computer processors, performs an operation for generating access credentials for a computer system within an information technology (IT) infrastructure comprising:
collecting data on a computer from one or more computerized sources communicating with the computer via a communications network, the collected data related to user access of the IT infrastructure;
creating, based on the collected data, a machine learning model for authenticating a request from a client device to access the computer system within the IT infrastructure, wherein the request specifies a user identifier, and wherein creating the machine learning model comprises:
evaluating the collected data related to user access, wherein collected data includes: i) one or more policies for granting access to the IT infrastructure, and ii) an urgency level associated with the request; and
creating an authorization policy for granting access to the computer system based on the evaluation;
upon processing at least the user identifier as an input to the machine learning model and determining to grant the request based on an output of the machine learning model, generating an access credential corresponding to the user identifier; and
providing the access credential to the client device.

9. The system of claim 8, wherein the operation further comprises:
identifying the one or more users requesting access to the IT infrastructure using biometric data associated with the user identifier.

10. The system of claim 8, wherein creating the machine learning model further comprises:
evaluating i) an urgency level associated with the request, and ii) an access history corresponding to another user identifier specified in other requests to access the computer system, wherein the another user identifier has one or more common credentials with the user identifier specified in the request.

11. The system of claim 10, wherein generating the access credential comprises:
utilizing the authorization policy to determine an authorization confidence score for granting the request to access the computer system within the IT infrastructure; and
upon determining that the authorization confidence score exceeds a predefined threshold level of confidence, granting the request.

12. The system of claim 11, wherein utilizing the authorization policy to determine an authorization confidence score further comprises:
increasing the authorization score if at least one of
the user identifier is registered in a configuration management database associated with the computer system to be accessed,
the user identifier is registered in a human resources database as having a role compatible with the computer system to be accessed,
the user identifier is registered in the human resources database as being part of a group associated with the computer system to be accessed,
the user identifier is registered as an active asset in the human resources database, and
the user identifier is registered in the human resources database as associated with an account that owns the computer system to be accessed.

13. The system of claim 11, wherein the operation further comprises:
determining a second authorization confidence score for granting a second request to access the computer system;
upon determining that the second authorization confidence score is less than the predefined threshold level of confidence, denying the second request to access the computer system;
generating a notification that indicates the second request was denied.

14. The system of claim 11, wherein the operation further comprises:
updating the machine learning model and the authorization policy, based on whether the request was granted.

15. A computer-readable storage medium containing computer program code that, when executed by operation of one or more computer processors, performs an operation for generating access credentials for a computer system within an information technology (IT) infrastructure, the operation comprising:
collecting data on a computer from one or more computerized sources communicating with the computer via a communications network, the collected data related to user access of the IT infrastructure;

creating, based on the collected data, a machine learning model for authenticating a request from a client device to access the computer system within the IT infrastructure, wherein the request specifies a user identifier, and wherein creating the machine learning model comprises:

evaluating the collected data related to user access, wherein collected data includes: i) one or more policies for granting access to the IT infrastructure, and ii) an urgency level associated with the request; and creating an authorization policy for granting access to the computer system based on the evaluation;

upon processing at least the user identifier as an input to the machine learning model and determining to grant the request based on an output of the machine learning model, generating an access credential corresponding to the user identifier; and providing the access credential to the client device.

16. The computer-readable storage medium of claim 15, wherein creating the machine learning model further comprises:

evaluating i) an urgency level associated with the request, and ii) an access history corresponding to another user identifier specified in other requests to access the computer system, wherein the another user identifier has one or more common credentials with the user identifier specified in the request.

17. The computer-readable storage medium of claim 16, wherein generating the access credential comprises:

utilizing the authorization policy to determine an authorization confidence score for granting the request to access the computer system within the IT infrastructure; and upon determining that the authorization confidence score exceeds a predefined threshold level of confidence, granting the request.

18. The computer-readable storage medium of claim 17, wherein utilizing the authorization policy to determine an authorization confidence score further comprises:

increasing the authorization score if at least one of:

the user identifier is registered in a configuration management database associated with the computer system to be accessed, the user identifier is registered in a human resources database as having a role compatible with the computer system to be accessed, the user identifier is registered in the human resources database as being part of a group associated with the computer system to be accessed, the user identifier is registered as an active asset in the human resources database, and the user identifier is registered in the human resources database as associated with an account that owns the computer system to be accessed.

19. The computer-readable storage medium of claim 18, wherein the operation further comprises:

determining a second authorization confidence score for granting a second request to access the computer system;

upon determining that the second authorization confidence score is less than the predefined threshold level of confidence, denying the second request to access the computer system;

generating a notification that indicates the second request was denied.

20. The computer-readable storage medium of claim 17, wherein the operation further comprises:

updating the machine learning model and the authorization policy, based on whether the request was granted.

* * * * *